United States Patent Office 3,499,256
Patented Mar. 10, 1970

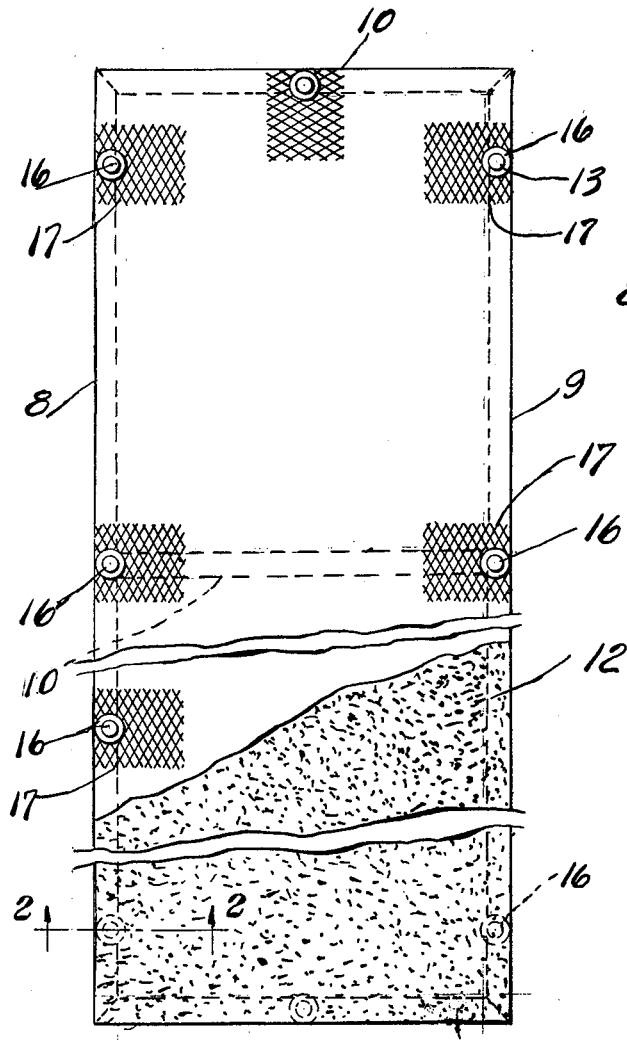
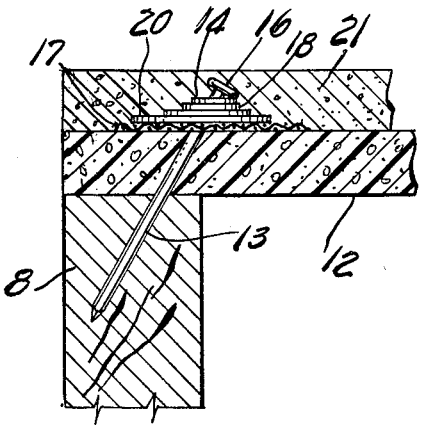
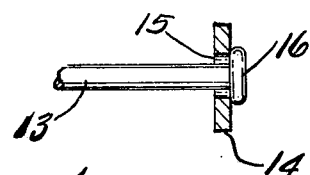
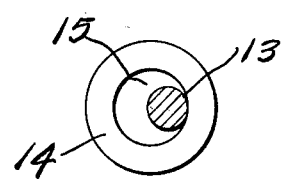
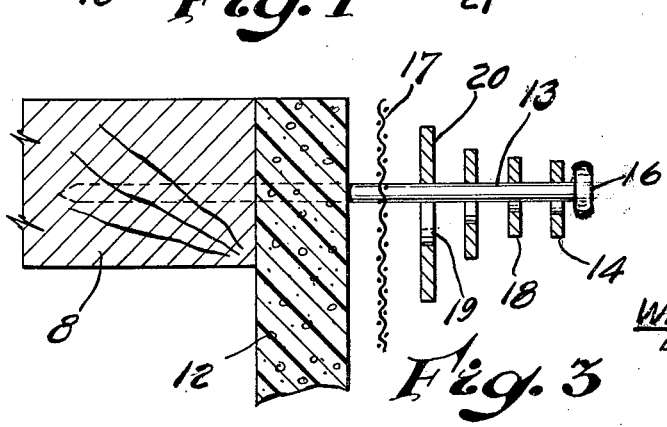

3,499,256
PANELS FOR HOMES AND BUILDING
CONSTRUCTION
Cecil F. Schaaf, 2126 E. Coldwater Road 48505, and
Walter Macciomei, 5615 Marlowe Drive 48504, both
of Flint, Mich.
Filed Sept. 18, 1967, Ser. No. 668,438
Int. Cl. E04c 1/04; E04f 13/04
U.S. Cl. 52—483                               1 Claim

---

The disclosure deals with a panel and means for securing several individual pieces in assembled relation, the securing means comprising a nail having a plurality of washers mounted thereon and movable in a transverse direction with relation to each other, and also an enlarged expanded metal member engageable with a washer and the assembly to provide an enlarged bearing area without in any manner loosening the driven nail.

---

One of the prime objects of the invention relates to means for combining two completely different materials in a manner to permit each one, or both, to function as a single unit without curtailing the general characteristics of either material, or its ability to function to the maximum when desired and found necessary.

One of the prime objects of the invention is to design a simple, practical, and economical low cost means for securing prefabricated materials together as a single unit adapted for erection with other similar units to provide a framework structure supporting means for any desired purpose.

Another object of the invention is to provide a structural unit, the use of which is very advantageous in many structural applications, together with economical securing means for securing the members in assembled relation and provide simplicity of manufacture and assembly, as well as adaptation to varying requirements.

With the above and other objects in view, the present invention consists in the combination and arrangement of parts, hereinafter more fully described, illustrated in the accompanying drawing, and more particularly pointed out in the appended claims, it being understood that changes may be made in the form, size, proportion and minor details of construction without departing from the spirit, or sacrificing any of the advantages of the invention.

In the drawing:

FIG. 1 is a face elevational view of a wall panel embodying the present invention, the finish material being broken away to show the securing means.

FIG. 2 is an enlarged, fragmentary, end elevational view taken on the line 2—2 of FIG. 1.

FIG. 3 is an enlarged, exploded plan view showing the nail, metal lath and washer assembly.

FIG. 4 is a side elevational view showing one of the washers mounted on a nail.

FIG. 5 is an end elevational view showing a washer mounted on a nail.

Referring now to the drawing in which we have shown the preferred embodiment of our invention.

The numerals 8 and 9 indicate a pair of spaced apart frame members of predetermined length and thickness which are connected together by cross members 10 using common nails 11, or any other securing means. This frame can be of any desired size and shape to suit the intended purpose, and a sheet of insulation or other material 12 is placed in position over the opening in the face of the frame and is secured in position by means of large nails 13 on which is mounted a series of washers of various sizes, first a small washer 14 formed with a center opening 15, which opening is of less diameter than the head 16 of the nail 13, to prevent passage of the nail head 16 therethrough (see FIGS. 3 and 4 of the drawing), and in securing the parts together a relatively small strip of expanded metal 17 is mounted on each nail, and when spotted in position on the insulation sheet the workman drives the nail 13 inwardly through the expanded metal lath 17, thence through the sheet 12 and into one of the members 8, 9 or 10 which forms the main frame of the panel. When, due to the nature of the insulation or other material used, additional washers are required, we provide a plurality of progressively larger washers 18 having larger openings 19 provided therein. These washers are mounted on the nail between the head 16 and the expanded metal strip 17, and any one, or all, of these washers can slide a limited distance with or laterally on each other and on the strip with relation to the body of the nail, the distance depending, of course, on the size of the opening in each washer. These washers permit transverse movement when, and if, there is movement of the insulation or other material caused by quakes, heavy winds, warpage, bending, or any other reason. The fact that the larger inner washer 20 bears on the face of the expanded metal strip creates an increased area bearing surface on the insulating material 12 and secures it firmly in position. After the insulation sheet is secured in position, a thin coating of high grade cement or other material 21, formed of any desired color, finish, and/or texture, is provided to conceal the nail heads and form an attractive finish to the exterior face surface of the panel. These panels are light in weight so that large panels can be readily handled and easily and quickly set up in end-to-end and edge-to-edge relation to form a wall, floor, roof, or other structure and it will, of course, be understood that where used to form floors or a roof construction, the frame is formed of heavier members and is reinforced to suit.

It will be seen that by the herein described construction there can be provided structural units which are very advantageous in forming panels for buildings in general, and that by following the construction described, the said units may be built without having visible any securing means such as, for example, the heads of nails or screws and expanded metal members used.

From the above described construction it will be understood that these panel units are particularly advantageous in connection with the construction of buildings and units of such general character that by following the construction as described, said structural units may be constructed without having the nail heads visible on the face thereof, and in which no forms are necessary; which can be constructed by unskilled labor, and in which the supporting frame can be formed of alternate materials such as bamboo or steel, using asphalt for facing, or it can be combined with other building materials that are accepted by the building codes of present day practice.

What we claim is:

1. A panel assembly comprising: a plurality of structural members secured together to form an open frame of predetermined size; a sheet of insulating material forming a closure for the open frame and secured in position by means of individual nails having a plurality of washer members formed with centrally disposed openings of varying diameters loosely mounted on each nail with the largest washer in bearing engagement with the frame; the heads of the nails being of greater diameter than the opening in at least one of the washers and movable transversely relative thereto; and a relatively small patch of expanded metal provided on said insulating material and through which the nail is driven for anchorage in said frame.

References Cited

UNITED STATES PATENTS

| | | | |
|---|---|---|---|
| 1,763,263 | 6/1930 | Shanks | 52—573 X |
| 2,208,094 | 7/1940 | Crandell | 52—363 X |
| 2,212,126 | 8/1940 | Phillips | 52—363 X |
| 2,633,049 | 3/1953 | Anderson | 52—363 X |

JOHN E. MURTAGH, Primary Examiner

U.S. Cl. X.R.

52—346, 363, 475, 573